United States Patent
Lee et al.

(10) Patent No.: US 9,707,834 B2
(45) Date of Patent: Jul. 18, 2017

(54) VEHICLE TRANSMISSION WITH COMMON CARRIER PLANETARY GEAR SET

(71) Applicant: GM GLOBAL TECHNOLOGY OPERATIONS LLC, Detroit, MI (US)

(72) Inventors: Chi Teck Lee, Nobelsville, IN (US); Arthur L. McGrew, Jr., Indianpolis, IN (US)

(73) Assignee: GM Global Technology Operations LLC, Detroit, MI (US)

(*) Notice: Subject to any disclaimer, the term of this patent is extended or adjusted under 35 U.S.C. 154(b) by 278 days.

(21) Appl. No.: 14/275,950

(22) Filed: May 13, 2014

(65) Prior Publication Data
US 2015/0330492 A1    Nov. 19, 2015

(51) Int. Cl.
| | |
|---|---|
| F16H 3/44 | (2006.01) |
| F16H 3/66 | (2006.01) |
| F16H 3/72 | (2006.01) |
| B60K 1/00 | (2006.01) |
| F16H 37/08 | (2006.01) |
| F16H 1/36 | (2006.01) |
| F16H 3/62 | (2006.01) |
| B60K 17/08 | (2006.01) |

(52) U.S. Cl.
CPC ............. *B60K 1/00* (2013.01); *F16H 1/36* (2013.01); *F16H 3/62* (2013.01); *F16H 3/663* (2013.01); *F16H 37/0813* (2013.01); *B60K 17/08* (2013.01); *B60K 2001/001* (2013.01); *F16H 3/66* (2013.01); *F16H 2200/0021* (2013.01); *F16H 2200/0034* (2013.01); *F16H 2200/0047* (2013.01); *F16H 2200/2005* (2013.01); *F16H 2200/2007* (2013.01); *F16H 2200/2035* (2013.01); *F16H 2200/2041* (2013.01)

(58) Field of Classification Search
None
See application file for complete search history.

(56) References Cited

U.S. PATENT DOCUMENTS

| | | | |
|---|---|---|---|
| 5,135,444 A * | 8/1992 | Hattori | F16H 3/663 475/285 |
| 5,443,130 A | 8/1995 | Tanaka et al. | |

(Continued)

FOREIGN PATENT DOCUMENTS

| | | |
|---|---|---|
| CN | 1936362 A | 3/2007 |
| CN | 1971090 A | 5/2007 |

*Primary Examiner* — Robert A Siconolfi
*Assistant Examiner* — Ryan Dodd
(74) *Attorney, Agent, or Firm* — Quinn IP Law

(57) ABSTRACT

A transmission with a common carrier planetary gear set is provided for a vehicle that has drive axle half shafts defining an axis of rotation, an electric motor/generator with a motor shaft parallel with the axis of rotation, either concentric with the axis of rotation or spaced therefrom, and a differential with a differential carrier connected with the drive axle half shafts. The planetary gear set has a first sun gear member continuously or selectively connectable with the motor shaft, first and second pinion gears, a carrier member rotatably supporting the first and the second pinion gears so that the first pinion gear meshes with the first sun gear member, and a ring gear member meshing with one of the pinion gears. The ring gear is connectable to a non-rotating housing. The carrier member is operatively connected with the differential carrier.

18 Claims, 5 Drawing Sheets

(56) References Cited

U.S. PATENT DOCUMENTS

| | | | |
|---|---|---|---|
| 5,620,387 A * | 4/1997 | Janiszewski | B60K 1/00 475/150 |
| 7,347,797 B2 | 3/2008 | Sowul et al. | |
| 7,367,910 B2 | 5/2008 | Schmidt | |
| 2012/0329597 A1 * | 12/2012 | Nomura | F16H 1/32 475/150 |
| 2014/0135169 A1 * | 5/2014 | Rossey | B60K 1/00 477/9 |

* cited by examiner

|   | B1 | B2 |
|---|----|----|
| R |    | X  |
| N |    |    |
| 1 |    | X  |
| 2 | X  |    |

|   | B1 | B2 |
|---|----|----|
| R | X  |    |
| N |    |    |
| 1 | X  |    |
| 2 |    | X  |

|   | B1 | B2 | C1 | C2 |
|---|----|----|----|----|
| R |    | X  | X  |    |
| N |    |    |    |    |
| 1 |    | X  | X  |    |
| 2 | X  |    | X  |    |
| 3 |    | X  |    | X  |
| 4 | X  |    |    | X  |
| 5 |    |    | X  | X  |

US 9,707,834 B2

VEHICLE TRANSMISSION WITH COMMON CARRIER PLANETARY GEAR SET

TECHNICAL FIELD

The present teachings relate to a vehicle transmission for providing tractive torque from an electric motor/generator to vehicle drive axle half shafts.

BACKGROUND

A battery electric vehicle utilizes electrical energy stored in one or more batteries to power one or more electric motors that provide tractive torque to propel the vehicle. A battery electric vehicle is an all-electric vehicle, and does not have an internal combustion engine or a fuel cell, as do many hybrid vehicles. A battery fuel cell vehicle is a type of hybrid vehicle that utilizes both stored energy from the battery to power an electric motor to propel the vehicle, and can recharge the battery when necessary with energy produced from a hydrogen fuel cell. Gear box designs using a stepped pinion-based architecture have been used in various single centerline electric vehicle drive unit applications where axial space is limited and a deeper gear reduction ratio is required.

SUMMARY

A transmission with a planetary gear set is provided for a vehicle. The vehicle has first and second drive axle half shafts that define an axis of rotation, and an electric motor/generator with a motor shaft parallel with the drive axle half shafts. In some embodiments, the motor shaft is parallel to and concentric with one of the drive axle half shafts, and rotates about the same axis of rotation as the half shafts, in what is referred to as an "on-axis" arrangement. In such embodiments, the differential has a first side gear connected to rotate in unison with the first drive axle half shaft and a second side gear connected to rotate in unison with the second drive axle half shaft. In other embodiments, the axis of rotation of the half shafts is parallel to but different than the axis of rotation of the motor shaft, in what is referred to as an "off-axis" arrangement.

A differential with a differential carrier is operatively connected with the carrier member. The planetary gear set has a first sun gear member continuously or selectively connectable with the motor shaft, first and second pinion gears that are coaxial with one another, a carrier member rotatably supporting the first and second pinion gears so that the first pinion gear meshes with the first sun gear member, and a ring gear member meshing with one of the pinion gears. In some embodiments, the first and second pinion gears are arranged on a stepped pinion such that they rotate in unison. In other embodiments, the first and second pinion gears can rotate independently of one another.

The transmission includes a non-rotating housing radially surrounding the ring gear member. The ring gear member is continuously or selectively connectable with the housing. The differential carrier is rotatably driven by the carrier member.

The planetary gear set as described enables a relatively deep ratio of torque of the carrier member to torque of the motor shaft, which provides greater torque multiplication, hence enabling downsizing of the electric motor/generator and yet achieving the same transmission output as a lesser numerical gear ratio design. Additionally, the packaging space afforded by the carrier member, and the housing allows additional members to be added to the planetary gear set, such as an additional sun gear member, and an additional ring gear member. Additional brakes and clutches can also be added within the internal cavity and the axial length provided by the housing and the carrier member. Transmissions operable at only a single speed or up to five forward speeds can thus be achieved while sharing many of the same components. The extra speed ratios, for example, with lower numerical gear ratios than the deeper first gear ratio would enable a reduction of the maximum required speed of the motor/generator and associated spin losses.

The above features and advantages and other features and advantages of the present teachings are readily apparent from the following detailed description of the best modes for carrying out the present teachings when taken in connection with the accompanying drawings.

DETAILED DESCRIPTION

Figure 1:
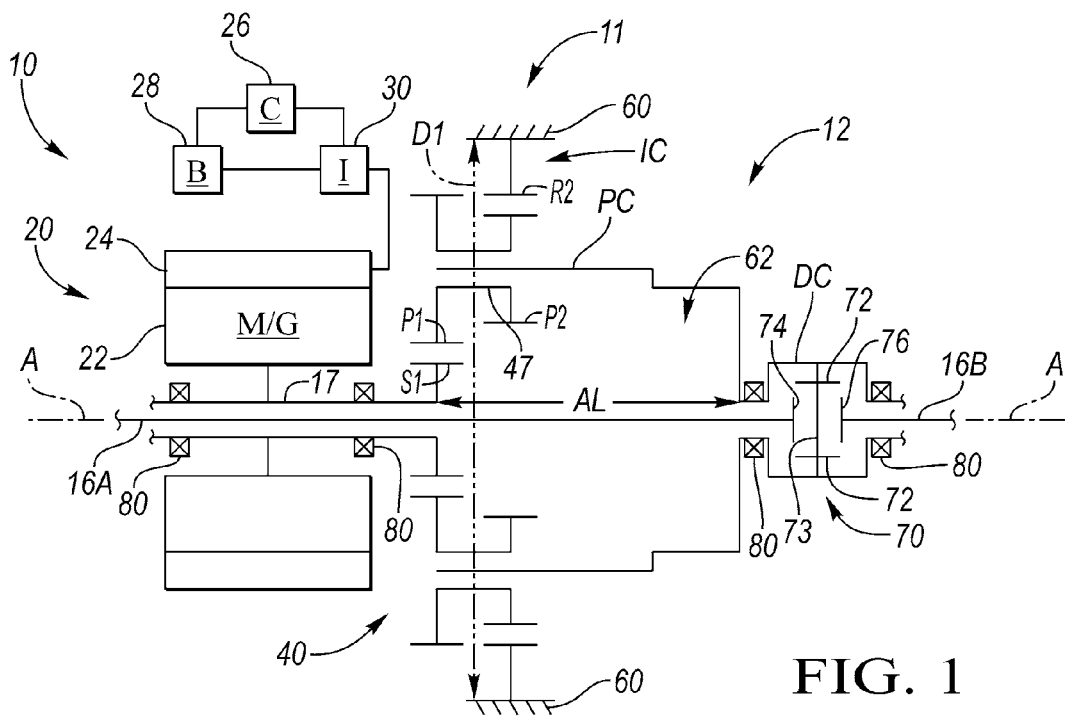
FIG. 1 is a schematic illustration in stick diagram form of a portion of a first embodiment of a vehicle with a first embodiment of a powertrain.

Referring to the drawings, wherein like reference numbers refer to like components throughout the several views, FIG. 1 shows a vehicle 10 that may be referred to as a battery electric vehicle. The vehicle 10 may instead be a battery fuel cell vehicle, having a fuel cell (not shown) connected with the battery 28 described herein. The vehicle 10 has a powertrain 11 that includes a transmission 12 that transmits torque from an electric motor/generator 20 to a first drive axle half shaft 16A and a second drive axle half shaft 16B through a common carrier planetary gear set 40 and a differential 70. The drive axle half shafts 16A, 16B may be front drive axle half shafts, so that the vehicle 10 is a front wheel-drive vehicle. Alternatively, the drive axle half shafts 16A, 16B could instead be rear drive axle half shafts. Still further, the components of powertrain 11 could be provided at both the front and rear axle half shafts to provide an all wheel-drive vehicle.

The transmission 12 transmits torque from a motor shaft 17 that serves as the transmission input member, to a planet carrier PC that serves as the transmission output member. The first and second drive axle half shafts 16A, 16B share a common axis of rotation A. The motor/generator 20 is concentrically arranged about the axis of rotation A in what is referred to as an on-axis arrangement. Specifically, the motor shaft 17 is a sleeve shaft that is parallel with, coaxial with, and radially surrounds a portion of the drive axle half shaft 16A. In other embodiments, such as described with respect to FIG. 9, the motor shaft is parallel with but not coaxial with the drive axle half shafts.

The electric motor/generator 20 includes a rotor 22 rotatably driven when electrical current is supplied to an annular stator 24 that surrounds the rotor 22. The motor/generator 20 may be an alternating current (AC) electric motor that uses stored energy from a battery (B) 28. A power inverter 30 converts current from direct current supplied from the battery 28 to alternating current to drive the motor/generator 20. The battery 28 and the inverter (I) 30 are controlled by the controller (C) 26. The controller 26 can also control the electric motor/generator 20 to function as a generator to convert mechanical energy of the rotor shaft 17 into stored electrical energy in the battery 28, such as in a regenerative braking mode to slow the drive axle half shafts 16A, 16B.

The planetary gear set 40 includes a first sun gear member S1 connected to rotate in unison with the motor shaft 17. As used herein, two components are connected to "rotate in unison" with one another when they are permanently, not selectively, connected such that they must rotate together at the same speed and are both held stationary when either is held stationary. The planetary gear set 40 also includes a carrier member PC that rotatably supports multiple stepped pinions 47, only two of which are shown. The carrier member PC is referred to as a "common carrier" or a "common carrier member" because it rotatably supports both pinion gears P1, P2 and is configured so that the pinion gears P1, P2 are coaxial. Each stepped pinion 47 includes a first pinion gear P1 and a second pinion gear P2 which are co-axial with one another. In this embodiment, each pair of coaxial pinion gears P1 and P2 are connected to rotate in unison with one another and are therefore referred to together as a stepped pinion 47. Accordingly, the planetary gear set 40 is a common carrier, stepped pinion planetary gear set. The first pinion gear P1 is larger in diameter than the second pinion gear P2 and meshes with the first sun gear member S1. Finally, the planetary gear set 40 includes a ring gear member R2 that is continuously grounded to a stationary housing 60. The ring gear member R2 is referred to herein as the second ring gear member, but is the only ring gear member in the transmission 12. The ring gear member R2 meshes with the second pinion gear P2. The housing 60 is configured to define an internal cavity IC that has a predetermined first diameter D1.

The housing 60 is shown only in partial fragmentary view. The housing 60 may be generally annular. However, the housing 60 is not limited to an annular shape. The diameter D1 or D2 (shown in FIG. 2) of the internal cavity may represent an effective diameter for a noncylindrical internal cavity IC. The carrier member PC similarly defines an interior space 62 that has an axial length AL. The first drive axle half shaft 16A extends through the interior space 62.

The carrier member PC rotates in unison with a differential carrier DC of the differential 70. A stationary differential housing (not shown) may surround the differential carrier DC. A shaft 73 secured to the differential carrier DC has differential pinions 72 fixed thereon. The differential pinions 72 mesh with first and second side gears 74, 76. The first side gear 74 is secured to the first drive axle half shaft 16A to rotate in unison therewith. The second side gear 76 is secured to the second drive axle half shaft 16B to rotate in unison therewith. Bearings 80 are strategically mounted to support rotating components such as the motor shaft 17, the carrier member PC and the differential carrier DC.

The transmission 12 has no selectively engageable torque-transmitting mechanisms such as clutches and brakes. Accordingly, the transmission 12 can establish only a single forward ratio of torque of the carrier member PC to torque of the motor shaft 17 (i.e., the transmission torque ratio, also referred to as the transmission gear ratio). For example, if the sun gear member S1 has 23 teeth, the first pinion gear P1 has 46 teeth, the second pinion gear P2 has 25 teeth, and the second ring gear member R2 has 91 teeth, then the transmission gear ratio will be 8.3. A reverse torque ratio of the same magnitude is established by controlling the motor/generator 20 so that the rotor 22 and motor shaft 17 rotate in a reverse direction. The deep forward gear ratio afforded by the use of the stepped pinion planetary gear set 40 allows the motor/generator 20 to be downsized due to the deep torque multiplication ratio.

Figure 2:
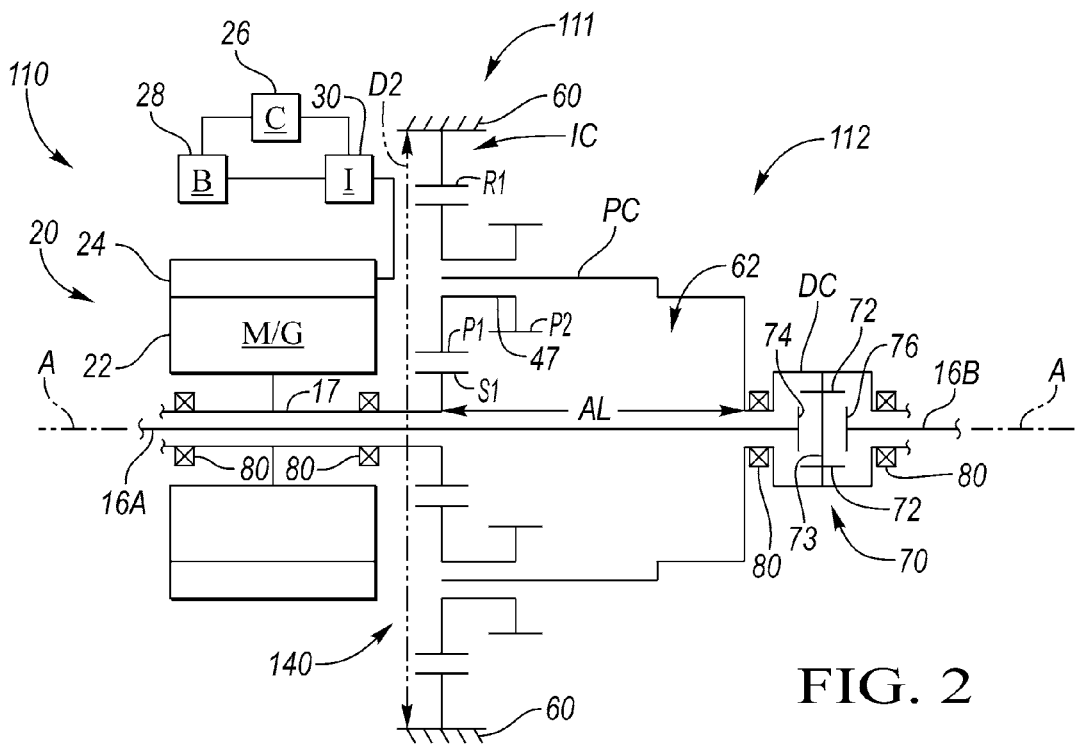
FIG. 2 is a schematic illustration in stick diagram form of a portion of a second embodiment of a vehicle with a second embodiment of a powertrain.
Figures 3, 4:
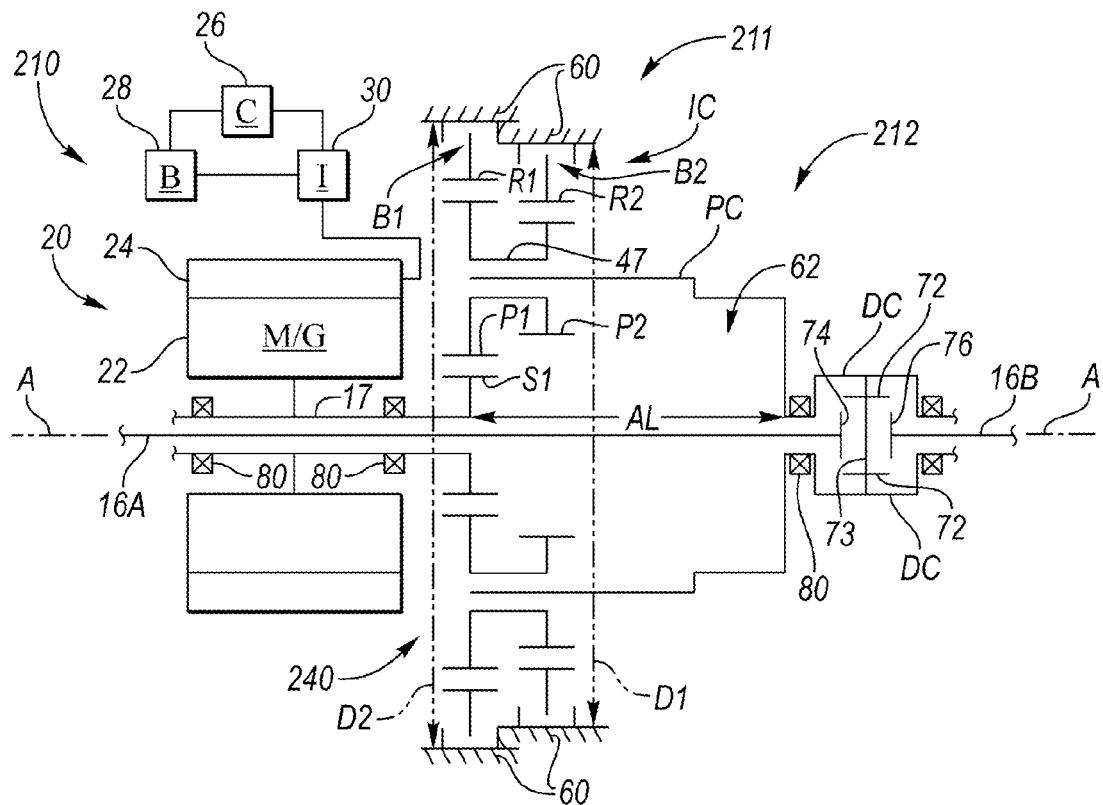
FIG. 3 is a schematic illustration in stick diagram form of a portion of a third embodiment of a vehicle with a third embodiment of a powertrain.
FIG. 4 is a table indicating the engagement state of torque-transmitting mechanisms to establish different available gear ratios in the transmission of FIG. 3.
Figures 5, 6:
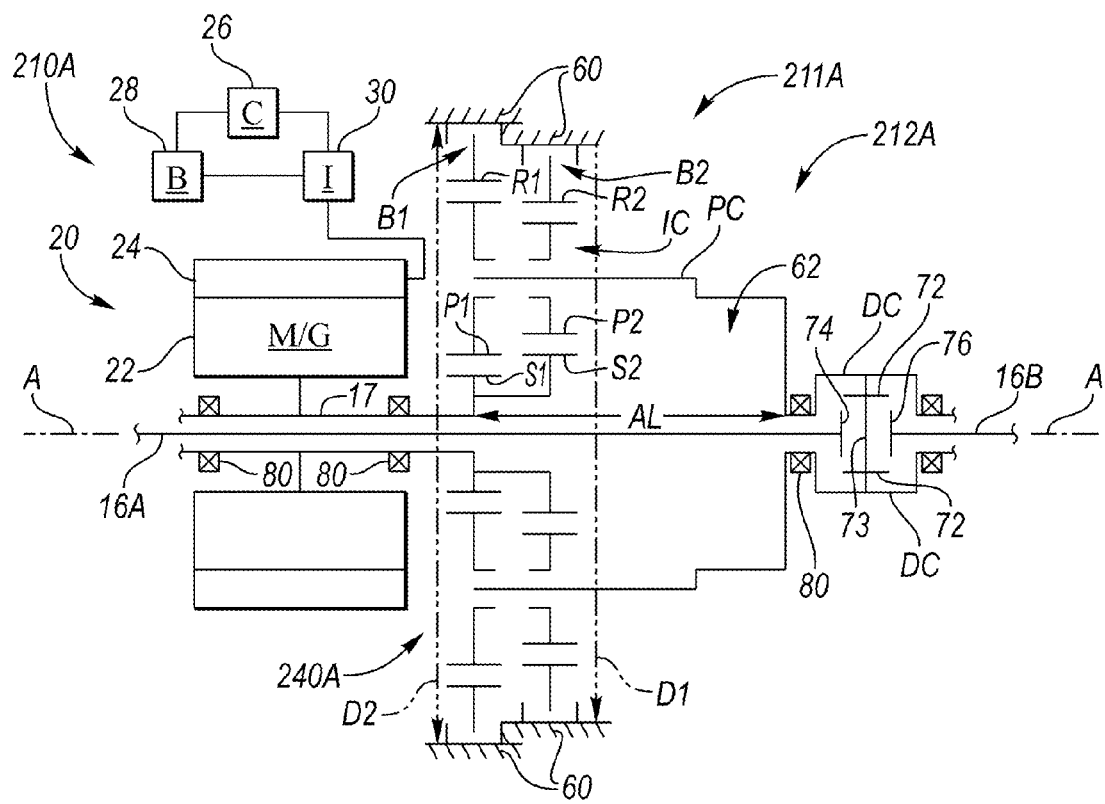
FIG. 5 is a schematic illustration in stick diagram form of a portion of a fourth embodiment of a vehicle with a fourth embodiment of a powertrain.
FIG. 6 is a table indicating the engagement state of torque-transmitting mechanisms to establish different available gear ratios in the transmission of FIG. 5.
Figures 7, 8:
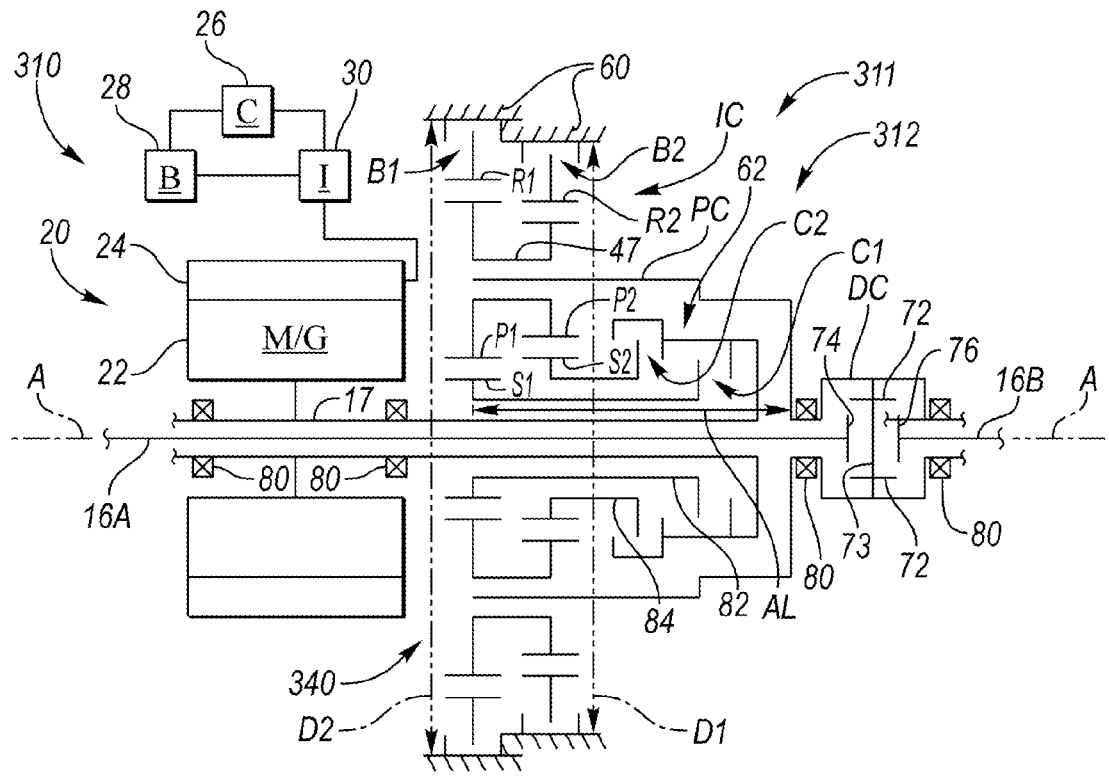
FIG. 7 is a schematic illustration in stick diagram form of a portion of a fifth embodiment of a vehicle with a fifth embodiment of a powertrain.
FIG. 8 is a table indicating the engagement state of torque-transmitting mechanisms to establish different available gear ratios in the transmission of FIG. 7.

FIG. 2 shows another embodiment of a battery electric vehicle 110 having a powertrain 111 and a transmission 112 alike in many aspects to the powertrain 11 and transmission 12 of the vehicle 10 of FIG. 1. Components that are identical to those of FIG. 1 function as described with respect to FIG. 1 and are labeled using the same reference numbers. Instead of a second ring gear member R2 of the planetary gear set 40, the transmission 112 has a common carrier planetary gear set 140 with a ring gear member R1, referred to herein as a first ring gear member. Ring gear R1 is continuously grounded to the stationary housing 60 so that the ring gear R1 is stationary. Ring gear member R1 meshes with the larger first pinion gear P1. The first pinion gear P1 is coaxial with, and is continuously connected to rotate in unison with the second pinion gear P2 as a stepped pinion. Both pinion gears P1 and P2 are rotatably supported by the common carrier member PC. Accordingly, the planetary gear set 140 is a common carrier, stepped pinion planetary gear set. The diameter D2 of the housing 60 radially outward of the first ring gear member R1 may be slightly larger than diameter D1 of FIG. 1, or the diameters D1 and D2 can be the same. In either case, the diameters D1 or D2 are sufficient to allow the packaging of a brake between the ring gear member R1 and the housing 60 and/or between the ring gear member R2 and the housing 60, as shown in FIGS. 3, 5, and 7.

The transmission 112 has no selectively engageable torque-transmitting mechanisms such as clutches and brakes. Accordingly, the transmission 112 can establish only a single forward ratio of torque of the carrier member PC to torque of the motor shaft 17. For example, if the sun gear member S1 has 23 teeth, the first pinion gear P1 has 46 teeth, the second pinion gear P2 has 25 teeth, and the first ring gear member R1 has 115 teeth, the transmission gear ratio will be 6.0. A reverse torque ratio of the same magnitude is established by controlling the motor/generator 20 so that the rotor 22 and motor shaft 17 rotate in a reverse direction.

Although the transmissions 12, 112 are each configured as a single speed transmission, the internal cavity IC, and the interior space 62 and axial length AL are sufficiently sized so that many of the same components can be reused in two-speed, three-speed, four-speed, and five-speed applications with the addition of one or two brakes, one or two clutches, and a second sun gear member, as shown and described with respect to FIGS. 3-8. The two-speed, three-speed, four-speed, and five-speed applications enable the motor/generator 20 to function at relatively low maximum rotor speed.

Operating the motor/generator 20 at a lower range of speeds reduces spin losses associated with cooling fluid circulated through the motor/generator 20. Additionally, less energy is needed to cool the motor/generator 20, and the powertrains 11, 111 thus operate more efficiently than a powertrain with a planetary gear set having a lower transmission gear ratio than planetary gear set 40 or 140.

FIG. 3 shows another embodiment of a battery electric vehicle 210 with a powertrain 211 having a transmission 212. The powertrain 211 and transmission 212 are alike in many aspects to the powertrain 11 and transmission 12 of the vehicle 10 of FIG. 1, and to the powertrain 111 and transmission 112 of FIG. 2. Components that are identical to those of FIGS. 1 and 2 and function as described with respect to FIGS. 1 and 2 are labeled using the same reference numbers.

The transmission 212 of FIG. 3 has a common carrier planetary gear set 240 with both a first ring gear member R1 and a second ring gear member R2. Additionally, the transmission 212 has a first brake B1 that is selectively engageable to ground the first ring gear member R1 to the housing 60. The first brake B1 radially surrounds the first ring gear member R1. The transmission 212 also has a second brake B2 that is selectively engageable to ground the second ring gear member R2 to the housing 60. The second brake B2 radially surrounds the second ring gear member R2. As in the embodiments of FIGS. 1 and 2, the first pinion gear P1 is coaxial with, and is continuously connected to rotate in unison with the second pinion gear P2 as a stepped pinion. Both pinion gears P1 and P2 are rotatably supported by the common carrier member PC. Accordingly, the planetary gear set 240 is a common carrier, stepped pinion planetary gear set.

The brakes B1 and B2 can be any type of selectively engageable brakes as will be readily understood by those skilled in the art, such as a brake having friction plates extending from the ring gear member interleaved with friction plates extending from the housing 60, and an apply member actuatable to engage the plates to one another. Engagement and disengagement of the brake B1 and B2 can be controlled by the controller 26 or by a separate transmission controller operatively connected with the controller 26. For example, the controller 26 can control a solenoid valve that enables hydraulic pressure to engage or disengage the brake B1 or B2.

The transmission 212 can be operated as a two-speed transmission, having two different forward torque ratios. Specifically, one forward ratio of torque of the carrier member PC to torque of the motor shaft 17 is established when only the first brake B1 is engaged, and another forward ratio of torque of the carrier member PC to torque of the motor shaft 17 is established when only the second brake B2 is engaged. With the gear tooth counts discussed with respect to FIGS. 1 and 2, a first torque ratio of 8.3 will be established when only the second brake B2 is engaged, and a second torque ratio of 6.0 will be established when only the first brake B1 is engaged. A reverse torque ratio of the same magnitude as the first torque ratio is established by controlling the motor/generator 20 so that the rotor 22 and motor shaft 17 rotate in a reverse direction when the second brake B2 is engaged.

A table of the various gear ratios that can be established by the transmission 212 is shown in FIG. 4. The first column indicates the gear states associated with the different gear ratios, reverse R, neutral N, first gear "1", and second gear "2". An "X" shown in the table indicates that the torque-transmitting mechanism associated with the column in which the "X" appears is in an engaged state. If no "X" appears, then the torque-transmitting mechanism associated with the column is in a disengaged state.

FIG. 5 shows another embodiment of a battery electric vehicle 210A with a powertrain 211A having a transmission 212A. The powertrain 211A and transmission 212A are alike in many aspects to the powertrain 211 and transmission 212 of the vehicle 210 of FIG. 3. Components that are identical to those of FIGS. 1-3 and function as described with respect to FIGS. 1-3 are labeled using the same reference numbers.

The transmission 212A of FIG. 5 is a common carrier planetary gear set 240A that has both the first ring gear member R1 and the second ring gear member R2. Additionally, the transmission 212A has the first brake B1 and the second brake B2. Unlike the common carrier, stepped pinion planetary gear set 240, the common carrier planetary gear set 240A has a second sun gear member S2 that is continuously connected to the first sun gear member S1 to rotate in unison with the first sun gear member S1. The transmission 212A is also different than the transmission 212 because, although the pinion gear P1 is coaxial with the pinion gear P2, and both are rotatably supported by the common carrier PC so that the planetary gear set 240A is a common carrier planetary gear set the pinion gear P1 is not continuously connected for rotation in unison with the pinion gear P2. In other words, the first pinion gear P1 can rotate independently of the second pinion gear P2, and the pinion gears P1, P2 do not rotate in unison as a stepped pinion.

With the transmission 212A as described, and assuming that the second sun gear member S2 has 41 teeth and the other ring gear members have the same number of teeth as described with respect to FIGS. 1-3, then the transmission 212A can be controlled to operate as a two-speed transmission, having two different forward torque ratios. Specifically, one forward ratio of torque of the carrier member PC to torque of the motor shaft 17 is established when only the first brake B1 is engaged, and another forward ratio of torque of the carrier member PC to torque of the motor shaft 17 is established when only the second brake B2 is engaged. With the gear tooth counts discussed with respect to FIGS. 1 and 2, a first torque ratio of 6.0 will be established when only the first brake B1 is engaged, and a second torque ratio of 3.2 will be established when only the second brake B2 is engaged. A reverse torque ratio of the same magnitude as the first torque ratio is established by controlling the motor/generator 20 so that the rotor 22 and motor shaft 17 rotate in a reverse direction when the second brake B1 is engaged. A table of the various gear ratios that can be established by the transmission 212A is shown in FIG. 6.

FIG. 7 shows another embodiment of a battery electric vehicle 310 with a powertrain 311 having a transmission 312. The powertrain 311 and transmission 312 are alike in many aspects to the powertrains 11, 111, 211, and 211A and transmissions 12, 112, 112A, and 212A of the vehicles 10, 110, 210, and 210A of FIGS. 1, 2, 3, and 5. Components that are identical to those of FIGS. 1, 2, 3, and 5 and function as described with respect to FIGS. 1, 2, 3, and 5 are labeled using the same reference numbers.

Like FIGS. 1 and 3, the pinion gears P1 and P2 of the transmission 312 are coaxial with one another, are rotatably supported on the common carrier PC, and are connected to rotate in unison with one another. Accordingly, the planetary gear set is a common carrier, stepped pinion planetary gear set. The first and second sun gear members S1 and S2 are not connected to one another for rotation in unison, and instead can rotate independently of one another at different speeds. The transmission 312 includes a first sleeve shaft 82 concentric with and radially outward of the motor shaft 17 and connected with the first sun gear member S1. A first clutch C1 is selectively engageable to connect the motor shaft 17 to the first sleeve shaft 82 so that the motor shaft 17 rotates in unison with the first sun gear member S1.

The transmission 312 also includes a second sleeve shaft 84 concentric with and radially outward of the first sleeve shaft 82 and the motor shaft 17. The second sleeve shaft 84 is connected with the second sun gear member S2. A second clutch C2 is selectively engageable to connect the motor shaft 17 to the second sleeve shaft 84 so that the motor shaft 17 rotates in unison with the second sun gear member S2.

The transmission 312 is operable to establish up to five forward gear ratios by engaging the clutches C1, C2 and brakes B1, B2 in different combinations of two. A table of the various gear ratios that can be established by the transmission 312 is shown in FIG. 7. Specifically, a first forward ratio of torque of the carrier member PC to torque of the motor shaft 17 is established in first gear (1) when only the second brake B2 and the first clutch C1 are engaged. A reverse torque ratio of the same magnitude as the first forward torque ratio is established in reverse gear (R) by controlling the motor/generator 20 so that the rotor 22 and motor shaft 17 rotate in a reverse direction when only the second brake B2 and the first clutch C1 are engaged. A second forward ratio of torque of the carrier member PC to torque of the motor shaft 17 is established in second gear (2) when only the first brake B1 and the first clutch C1 are engaged. A third forward ratio of torque of the carrier member PC to torque of the motor shaft 17 is established in third gear (3) when only the second brake B2 and the second clutch C2 are engaged. A fourth forward ratio of torque of the carrier member PC to torque of the motor shaft 17 is established in fourth gear (4) when only the first brake B1 and the second clutch C2 are engaged. A fifth forward ratio of torque of the carrier member PC to torque of the motor shaft 17 is established in fifth gear (5) when only the first clutch C1 and the second clutch C2 are engaged.

With the gear tooth counts discussed with respect to FIGS. 1 and 2, the first torque ratio is 8.3, the second torque ratio is 6.0, the third torque ratio is 3.22, the fourth torque ratio is 2.5, and the fifth torque ratio is 1.0 (direct drive). Thus the fifth gear allows very high vehicle speed with relatively low electric motor speed, such as but not limited to 1000 revolutions per minute (rpm). This advantageously allows maximum motor torque to be used in high vehicle speed operation. The transmission 312 can be controlled to establish only some of the available speed ratios, or all of the available speed ratios.

The internal cavity IC is sufficiently sized to house the first and second brakes B1, B2 radially outward of the ring gear members R1, R2. The interior space 62 and the axial length AL are sufficient to house the first clutch C1 and the second clutch C2. Accordingly, because the interior cavity IC, the interior space 62, and the axial length AL are of sufficient size, many of the same components used to establish the single speed transmission 12 or 112 can be used to establish two-speed and five-speed transmissions 212, 212A, and 312. On-axis battery electric vehicles can be cost-efficiently configured for many different applications by providing the motor/generator 20, a differential the same as or similar than differential 70, and the components of the transmission 12, 112, 212, 212A, or 312. The various planetary gear sets 40, 140, 240, 240A and 340 shown and described herein enable the flexibility and efficiencies of the powertrains 11, 111, 211, 211A, and 311.

Figure 9:
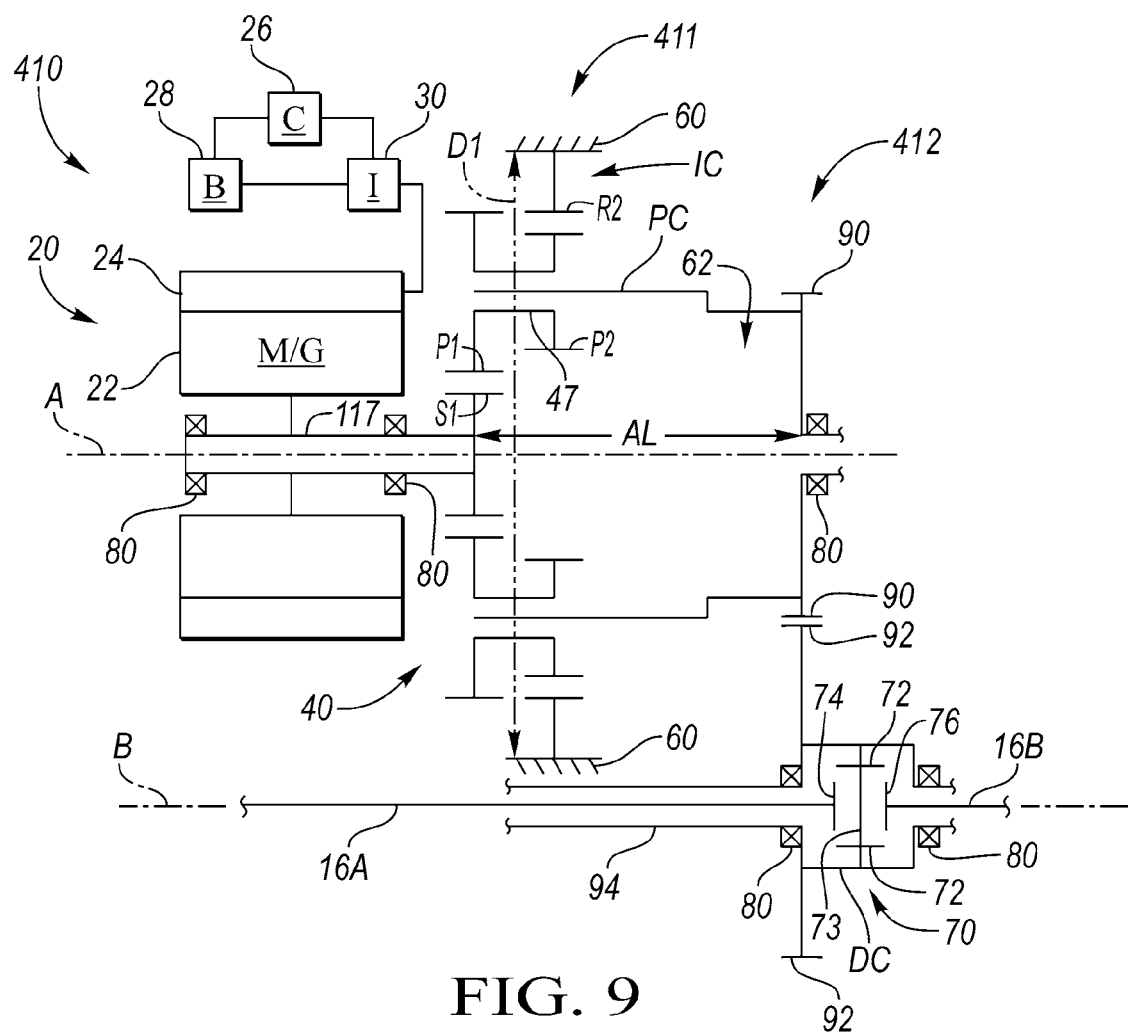
FIG. 9 is a schematic illustration in stick diagram form of a portion of a sixth embodiment of a vehicle with a sixth embodiment of a powertrain.

FIG. 9 shows another embodiment of a battery electric vehicle 410 with a powertrain 411 having a transmission 412. The powertrain 411 and transmission 412 are alike in many aspects to the powertrains 11, 111, 211, 211A, 311 and transmissions 12, 112, 212, 212A, 312 of the vehicles 10, 110, 210, 210A, 310 of FIGS. 1, 2, 3, 5, and 7. Components that are identical to those of FIGS. 1, 2, 3, 5, and 7 and function as described with respect to FIGS. 1, 2, 3, 5, and 7 are labeled using the same reference numbers.

The transmission 412 is arranged as an off-axis transmission, as the axis of rotation B of the half shafts 16A, 16B is parallel to but different than the axis of rotation A of the motor shaft 117, in what is referred to as an off-axis arrangement. The motor shaft 117 is a solid shaft, or could be a sleeve shaft, but is not concentric with half shaft 16A as in the transmissions 12, 112, 212, 212A, 312.

A first set of external gear teeth 90 surround the common carrier member PC. The external gear teeth 90 may be integrally formed at the outer diameter of the carrier member PC, or may be on a ring gear bolted to or otherwise attached for rotation with the carrier member PC. The first set of external gear teeth 90 meshes with a second set of external gear teeth 92 that surround the differential carrier DC. The external gear teeth 92 may be integrally formed on the differential carrier DC or may be on a ring gear bolted to or otherwise attached for rotation with the differential carrier DC. As shown, a sleeve 94 also extends from the differential carrier DC and surrounds the half shaft 16A. The sleeve 94 may be an integrally formed portion of the differential carrier DC or may be bolted or otherwise connected for rotation with the differential carrier DC.

The relative numbers of the external gear teeth 90, 92 may be configured to provide additional speed reduction or final drive gear ratio from the carrier member PC to the half shafts 16A, 16B. With additional speed reduction, many or all of the components of the transmission 412 could be downsized (i.e., made relatively smaller than) the components of the transmissions 12, 112, 212, 212A, 312, while providing the same range of output torque and speed at the half shafts 16A, 16B. For example, any or all of the motor/generator 20, the planetary gear set 40, the motor shaft 117, and the bearings 80 could be downsized due to the additional speed reduction While the best modes for carrying out the present teachings have been described in detail, those familiar with the art to which these teachings relate will recognize various alternative designs and embodiments for practicing the present teachings within the scope of the appended claims.

The invention claimed is:

1. A transmission for a vehicle, the vehicle including first and second drive axle half shafts rotatable about an axis of rotation, an electric motor/generator with a motor shaft parallel with the drive axle half shafts, and a differential with a differential carrier operatively connected with the drive axle half shafts, the transmission comprising:
  a planetary gear set having:
    a first sun gear member continuously connected or selectively connectable with the motor shaft;
    a stepped pinion with first and second pinion gears coaxial with one another and permanently connected together to rotate in unison at a common speed;
    a carrier member rotatably supporting the stepped pinion so that the first pinion gear meshes with the first sun gear member;
    a second sun gear member meshing with the second pinion gear;
    a first ring gear member meshing with one of the pinion gears; and a second ring gear member meshing with the other one of the pinion gears;

a non-rotating housing radially surrounding the first and second ring gear members;

a first brake selectively engageable to ground the first ring gear member to the housing;

a second brake selectively engageable to ground the second ring gear member to the housing;

a first clutch selectively engageable to connect the motor shaft to rotate in unison with the first sun gear member; and a second clutch selectively engageable to connect the motor shaft to rotate in unison with the second sun gear member, wherein the carrier member is operatively connectable to the differential carrier, and the transmission is operable to establish five different forward ratios of torque of the carrier member to torque of the motor shaft by engaging the clutches and brakes in different combinations of two.

2. The transmission of claim 1, wherein the first pinion gear is larger in diameter than the second pinion gear, and wherein the second ring gear member meshes with the second pinion gear.

3. The transmission of claim 1, wherein the first pinion gear is larger in diameter than the second pinion gear, and wherein the first ring gear member meshes with the first pinion gear.

4. The transmission of claim 1, wherein the first ring gear member meshes with the first pinion gear, and the second ring gear member meshes with the second pinion gear, and wherein one ratio of torque of the carrier member to torque of the motor shaft is established when only the first brake is engaged, and another ratio of torque of the carrier member to torque of the motor shaft is established when only the second brake is engaged.

5. The transmission of claim 1, wherein the second ring gear member meshes with the second pinion gear; wherein the first sun gear is selectively connectable to the second sun gear to rotate in unison therewith, and wherein a first ratio of torque of the carrier member to torque of the motor shaft is established when only the first brake is engaged, and a lower second ratio of torque of the carrier member to torque of the motor shaft is established when only the second brake is engaged.

6. A transmission for a vehicle, the vehicle including first and second drive axle half shafts rotatable about an axis, an electric motor/generator with a motor shaft parallel with the drive axle half shafts, and a differential with a differential carrier operatively connected with the drive axle half shafts, the transmission comprising:

a planetary gear set having:
a first sun gear member continuously connected or selectively connectable with the motor shaft;
a stepped pinion with first and second pinion gears coaxial with one another and permanently connected together to rotate in unison at a common speed;
a carrier member operatively connectable to the differential carrier and rotatably supporting the stepped pinion such that the first pinion gear meshes with the first sun gear member; and
a first ring gear member meshing with one of the pinion gears; and
a non-rotating housing radially surrounding the ring gear member, the ring gear member being continuously connected or selectively connectable with the housing, wherein the planetary gear set has a second sun gear member meshing with the second pinion gear, and wherein the planetary gear set has a second ring gear member meshing with the second pinion gear;

wherein the housing defines an internal cavity having a first predetermined diameter, wherein the planetary gear set is positioned within the internal cavity, and wherein the internal cavity houses a first selectively engageable brake engageable to ground the first ring gear member to the housing, and a second selectively engageable brake engageable to ground the second ring gear member to the housing; and wherein the carrier member defines an interior space radially inward thereof, and wherein the interior space houses a first clutch selectively engageable to connect the motor shaft for rotation in unison with the first sun gear member, and a second clutch selectively engageable to connect the motor shaft for rotation in unison with the second sun gear member.

7. A powertrain for a vehicle, the vehicle having first and second drive axle half shafts establishing an axis of rotation about which both of the drive axle half shafts are rotatable, the powertrain comprising:

an electric motor/generator having a motor shaft parallel with the axis of rotation;

a transmission including:
a planetary gear set having:
a first sun gear member continuously connected or selectively connectable with the motor shaft;
a stepped pinion with first and second pinion gears coaxial with one another and permanently connected together to rotate in unison at a common speed;
a carrier member rotatably supporting the stepped pinion so that the first pinion gear meshes with the first sun gear member;
a second sun gear member meshing with the second pinion gear;
a first ring gear member meshing with one of the pinion gears; and
a second ring gear member meshing with the other one of the pinion gears;
a non-rotating housing radially surrounding the first and second ring gear members;
a first brake selectively engageable to ground the first ring gear member to the housing;
a second brake selectively engageable to ground the second ring gear member to the housing;
a first clutch selectively engageable to connect the motor shaft to rotate in unison with the first sun gear member; and
a second clutch selectively engageable to connect the motor shaft to rotate in unison with the second sun gear member, and a differential having a differential carrier operatively connected to the carrier member and to the drive axle half shafts, wherein the transmission is operable to establish five different forward ratios of torque of the carrier member to torque of the motor shaft by engaging the clutches and brakes in different combinations of two.

8. The powertrain of claim 7, wherein the first pinion gear is larger in diameter than the second pinion gear, and wherein the second ring gear member meshes with the second pinion gear.

9. The powertrain of claim 7, wherein the first pinion gear is larger in diameter than the second pinion gear, and wherein the first ring gear member meshes with the first pinion gear.

10. The powertrain of claim 7, wherein the first ring gear member meshes with the first pinion gear, and the second ring gear member meshes with the second pinion gear; and wherein one ratio of torque of the carrier member to torque of the motor shaft is established when only the first brake is engaged, and another ratio of torque of the carrier member to torque of the motor shaft is established when only the second brake is engaged.

11. The powertrain of claim 7, wherein the second ring gear member meshes with the second pinion gear; and wherein the first sun gear member is selectively connectable to the second sun gear member to rotate in unison therewith; and wherein a first ratio of torque of the carrier member to torque of the motor shaft is established when only the first brake is engaged, and a lower second ratio of torque of the carrier member to torque of the motor shaft is established when only the second brake is engaged.

12. A powertrain for a vehicle, the vehicle having first and second drive axle half shafts both rotatable about an axis of rotation, the powertrain comprising:
    an electric motor/generator having a motor shaft parallel with the axis of rotation;
    a transmission including:
        a planetary gear set having:
            a first sun gear member continuously connected or selectively connectable with the motor shaft;
            a stepped pinion with first and second pinion gears coaxial with one another and permanently connected together to rotate in unison at a common speed;
            a carrier member rotatably supporting the stepped pinion so that the first pinion gear meshes with the first sun gear member;
            a ring gear member meshing with one of the pinion gears; and
            a non-rotating housing radially surrounding the ring gear members, the ring gear member being continuously connected or selectively connectable with the housing; and
        a differential having a differential carrier operatively connected to the carrier member and to the drive axle half shafts,
    wherein the planetary gear set has a second sun gear member meshing with the second pinion gear, wherein the ring gear member is a first ring gear member, and wherein the stepped pinion planetary gear set has a second ring gear member meshing with the second pinion gear;
    wherein the housing defines an internal cavity having a first predetermined diameter, wherein the planetary gear set is positioned within the internal cavity, and wherein the internal cavity houses a first selectively engageable brake engageable to ground the first ring gear member to the housing, and a second selectively engageable brake engageable to ground the second ring gear member to the housing; and
    wherein the carrier member defines an interior space radially inward thereof, and wherein the interior space houses a first clutch selectively engageable to connect the motor shaft for rotation in unison with the first sun gear member, and a second clutch selectively engageable to connect the motor shaft for rotation in unison with the second sun gear member.

13. The powertrain of claim 7, wherein the motor shaft includes a sleeve shaft that is coaxial with the axis of rotation of the first and second drive axle half shafts, the sleeve shaft being concentric with and surrounding one of the drive axle half shafts.

14. The powertrain of claim 7, wherein the motor shaft rotates about a different axis of rotation parallel with the axis of rotation of the first and second drive axle half shafts; and
    the transmission further comprising:
        a first set of external gear teeth operatively connected with the carrier member; and
        a second set of external gear teeth operatively connected with the differential carrier and meshing with the first set of external gear teeth.

15. A transmission for a vehicle, the vehicle including first and second drive axle half shafts defining an axis of rotation, an electric motor/generator with a motor shaft concentric with one of the drive axle half shafts about the axis of rotation, and a differential with a differential carrier concentrically rotatable about the axis of rotation and having side gears connected to rotate in unison with the drive axle half shafts, the transmission comprising:
    a stepped pinion planetary gear set having:
        a first sun gear member;
        a second sun gear member;
        a stepped pinion having first and second coaxial pinion gears permanently connected to one another to rotate in unison at a common speed;
        a carrier member rotatably supporting the stepped pinion so that the first pinion gear meshes with the first sun gear member and the second pinion gear meshes with the second sun gear member, the carrier member being connected to the differential carrier to rotate in unison with the differential carrier;
        a first ring gear member meshing with the first pinion gear; and
        a second ring gear member meshing with the second pinion gear;
    a non-rotating housing radially surrounding the first and second ring gear members;
    a first brake selectively engageable to ground the first ring gear member to the housing;
    a second brake selectively engageable to ground the second ring gear member to the housing;
    a first sleeve shaft concentric with the motor shaft and connected with the first sun gear member;
    a first clutch selectively engageable to connect the motor shaft to the first sleeve shaft so that the motor shaft rotates in unison with the first sun gear member;
    a second sleeve shaft concentric with and radially outward of the first sleeve shaft and connected with the second sun gear member; and
    a second clutch selectively engageable to connect the motor shaft to the second sleeve shaft so that the motor shaft rotates in unison with the second sun gear member,
    wherein the transmission is operable to establish up to five forward gear ratios by engaging the clutches and brakes in different combinations of two.

16. The transmission of claim 15, wherein the second sun gear member and the second clutch are positioned axially between the first sun gear member and the first clutch.

17. The transmission of claim 1, wherein the drive axle shafts, the motor shaft, the differential carrier, the first sun gear member, the carrier member, and the ring gear member are all coaxially aligned on the axis of rotation.

18. The transmission of claim 1, wherein the carrier member defines an interior space radially inward thereof, and wherein the first drive axle shaft extends from the motor shaft, through the interior space of the carrier member, and into the differential.

\* \* \* \* \*